J. W. AYLSWORTH & D. SMITH.
PRODUCTION OF HOLLOW RESILIENT BALLS.
APPLICATION FILED MAR. 14, 1911.

1,134,433.

Patented Apr. 6, 1915.

Witnesses:
Frank D Lewis
Jennie Stalker

Inventors:
Jonas W. Aylsworth and
Dyer Smith by
Dyer Smith
their Atty.

UNITED STATES PATENT OFFICE.

JONAS W. AYLSWORTH, OF EAST ORANGE, AND DYER SMITH, OF MONTCLAIR, NEW JERSEY, ASSIGNORS TO CONDENSITE COMPANY OF AMERICA, OF GLEN RIDGE, NEW JERSEY, A CORPORATION OF NEW JERSEY.

PRODUCTION OF HOLLOW RESILIENT BALLS.

1,134,433.   Specification of Letters Patent.   Patented Apr. 6, 1915.

Application filed March 14, 1911. Serial No. 614,375.

*To all whom it may concern:*

Be it known that we, JONAS W. AYLSWORTH, a citizen of the United States, and a resident of East Orange, in the county of Essex and State of New Jersey, and DYER SMITH, a citizen of the United States, and a resident of Montclair, in the county of Essex and State of New Jersey, have invented certain new and useful Improvements in the Production of Hollow Resilient Balls, of which the following is a description.

Our invention relates to the production of hollow balls of a resilient nature which are particularly adapted for use as golf balls.

Our invention is an improvement upon that disclosed in the application of Frank L. Dyer, entitled Golf balls and method of making the same, Serial No. 613,630, filed March 10, 1911. In the said application a ball is formed with a hollow shell, preferably composed of a phenolic condensation product, the interior of the ball preferably being filled with highly compressed air or other gas, thus forming a resilient core.

The object of our invention is to devise an improved process for the manufacture of such balls and particularly for causing the same to be filled with highly compressed air or other gas. In order that a clearer understanding of our invention may be had, attention is hereby directed to the accompanying drawings forming part of this specification, in which—

Figure 1:
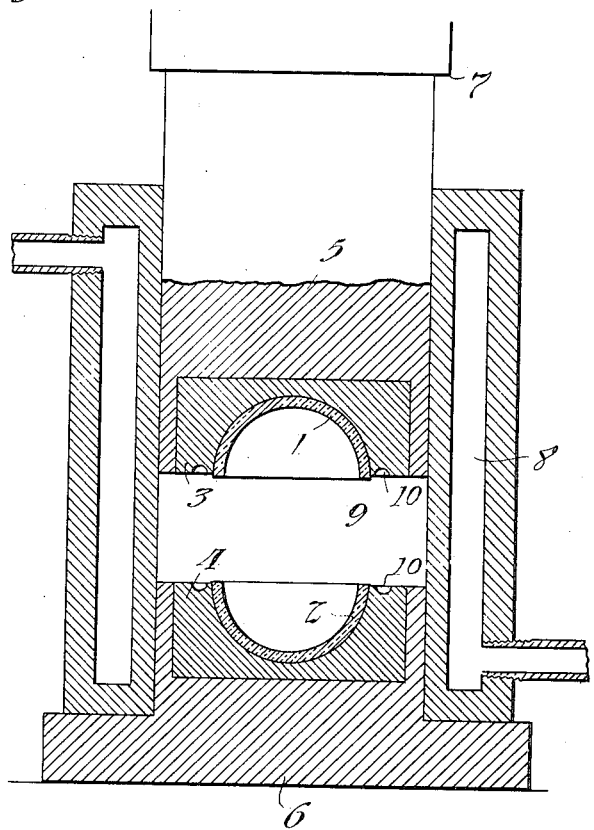
Figure 2:
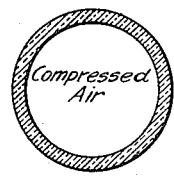

Figure 1 represents a vertical cross section of an apparatus comprising one form of our invention and in which our improved process is adapted to be carried out; and Fig. 2 represents a cross section of the finished ball formed by the said process.

Referring to the drawings, the reference characters 1 and 2 designate half shells formed of a suitable plastic material which, as shown in the drawings, are positioned in suitable upper and lower die members 3 and 4 mounted respectively in the plunger 5 and the bed plate 6 of the hydraulic press 7 having a steam jacket 8 or other suitable means for heating and cooling the press. The material of which the half shells 1 and 2 are composed may be any suitable plastic composition which may subsequently be hardened by application of heat to cause a hardening chemical reaction, or by application of cold, as in the case of other plastic substances. Preferably, however, the composition used is a phenolic condensation product such as is described in the application of said Dyer referred to, and in application of Jonas W. Aylsworth entitled Method of molding hollow objects of refractory condensation products, Serial No. 613,576, filed March 10, 1911. Preferably the composition is a mixture comprising a fusible phenolic condensation product or phenol resin, and an amount of hexamethylene-tetra-amin, paraformaldehyde, or other substance containing the methylene radical $CH_2$, which may be caused to react with the fusible phenol resin upon application of sufficient heat to form a refractory infusible product. Also incorporated with the mass are preferably one or more solid solvent elements or plasticity ingredients, such as naphthalene and some of its derivatives, chlorinated phenol, di-nitro-benzene, or the like, and filling bodies such as wood flour, cotton flock, and the like. Fibrous or cellular filling bodies and also the solid solvent agents add toughness to the body of the ball and relieve stresses within the same. The plasticity agent which I prefer to use is a higher chlorin substitution product of a phenol or cresol, such as penta-chlorophenol. The plasticity agents and filling bodies may be used in widely varying percentages. The percentage of the methylene-containing hardening agent may be calculated from the composition of the fusible phenol resin used, and should be from 5 to 12 per cent. of the weight of the phenol resin in order to combine fully therewith without excess.

The composition of which the shell is formed might also be a partial reaction product of phenol and formaldehyde or their equivalents, which may become hardened by further reaction, or it may be the final product resulting from the reaction between a fusible phenol resin, a methylene-containing agent in the presence of a plasticity agent, such as the chloro-phenol, which product is infusible, but sufficiently plastic upon application of sufficient heat to be formed in the dies and to permit the two half shells to be welded together under application of heat and pressure.

The cylinder 9 of the press 7 is entirely closed at the bottom by the base plate 6, in which the die member 4 is mounted and the press plunger 5 which carries die member 3 and which is adapted to reciprocate in cylinder 9 fills the same completely to prevent escape of air past the same.

In operation, the half shells 1 and 2 are placed in position in their respective die members in the press, the opposing edges of the half spheres being in alinement with each other. The plunger 5 is then lowered into the cylinder of the press, steam being turned on in the steam jacket 8 to heat the half shells sufficiently to make the same plastic or to maintain the same in plastic condition. The press plunger 5 is then forced downwardly until the opposing edges of the half shells are brought into contact with each other, which position is maintained with application of sufficient heat until the final reaction of the ingredients composing the half shells has taken place, and the half shells have become welded together to form an integral ball, if a composition is used in which reaction should ensue in the mold. If the composition used is one in which no further reaction has to take place, the heat and pressure are maintained simply for a sufficient length of time to cause the complete welding together of the half shells. If desired, a suitable binding or agglutinating material may be placed upon the opposing edges of the half spheres to aid in the adhesion of the same to form a complete ball.

It is obvious that during the descent of the press plunger 5, the air or other gas in the cylinder 9 between the upper surface of base plate 6, die member 4, and lower half shell 2 on the one hand, and the lower face of press plunger 5, die member 3, and half shell 1 on the other hand, will be compressed. This air has no opportunity to escape, or only a slight opportunity, during the descent of the press plunger, and consequently, when the die members have been brought together, all, or substantially all the air which was between the upper and lower die members will have been forced within the hollow interior of the ball being formed. By this means we may obtain air under any desired pressure in the interior of the ball, the pressure being controlled by the length of stroke of the plunger, and the leakage permitted past the same during its descent. During the pressing operation, the half shells of the ball will be welded together to form an integral homogeneous sphere, the pressure on the interior of the same pressing the plastic material firmly into contact with the dies to take either a smooth finished surface or a roughened or knurled surface, as desired, in accordance with the nature of the mold surface, it being thus only necessary to form the sheet material of which the half spheres are made roughly into the shape of half spheres before the die members are brought together. After the formation of the ball is completed, the press is cooled, the press plunger raised, and the ball removed therefrom. If the ball is formed of the phenolic condensation product referred to, it will now be infusible and will not stick to the mold. A slight bur or fin will be formed around the ball at the line of welding, but this can easily be removed by any well known means. During the pressing operation, excess material will be forced out between the half spheres into suitable flash openings 10.

It will thus be seen that we have devised an efficient and economical process for forming hollow balls of the nature described. If the same are to be used as golf balls, the necessary weight may be given the same by adding sufficient loading material to the composition, or by suitably regulating the thickness of the shell. It will be obvious that the operation may be carried on expeditiously by using a large number of dies similar to those shown in the drawings in the same press. The ball thus formed will be highly resilient because of the nature of the composition of which the shell is formed, and because of the compressed air or gas core, the ball will be tough, hard and durable, and will not be affected by chemical or corroding agencies.

Having now described our invention, what we claim and desire to secure by Letters Patent is as follows:—

The process of making hollow resilient balls, which consists in forming two half shells of material comprising a fusible phenolic condensation product capable of being hardened into an infusible mass on application of sufficient heat, placing the same in a tube in alinement with each other with their interiors opposed, and forcing the same together while preventing escape of air or other gas from the space between the half shells until their adjacent edges abut, heating the said adjacent edges to cause the same to weld together to form a continuous ball with air or other gas compressed within the same, forming a compressed air core therefor, and applying heat sufficient to harden the ball into an infusible hard shell, cooling and removing the same, substantially as described.

This specification signed and witnessed at West Orange, N. J., this 8th day of March, 1911.

JONAS W. AYLSWORTH.
DYER SMITH.

Witnesses:
ANNA R. KLEHM,
KATHRYN G. KORB.